Jan. 23, 1945.  E. A. THORSBERG  2,367,743
MEASURING IMPLEMENT
Filed May 10, 1943
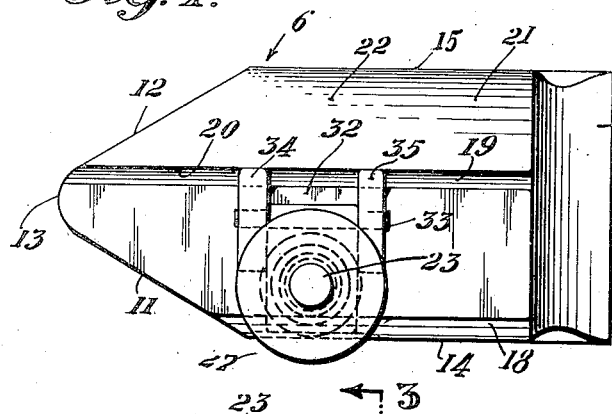
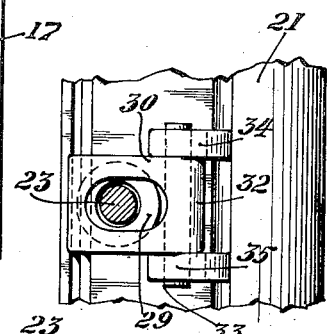
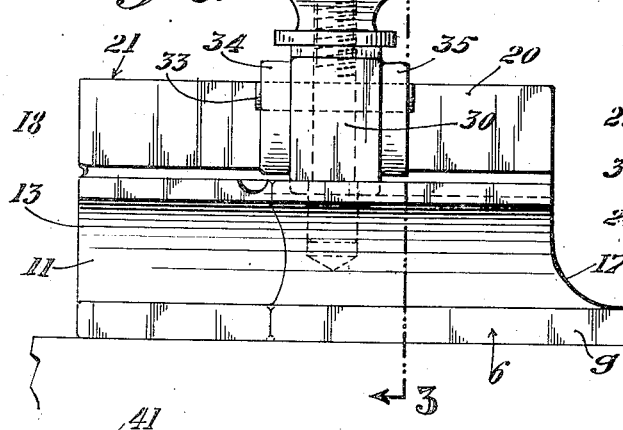
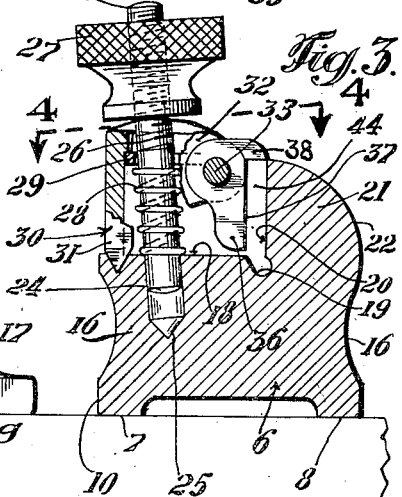
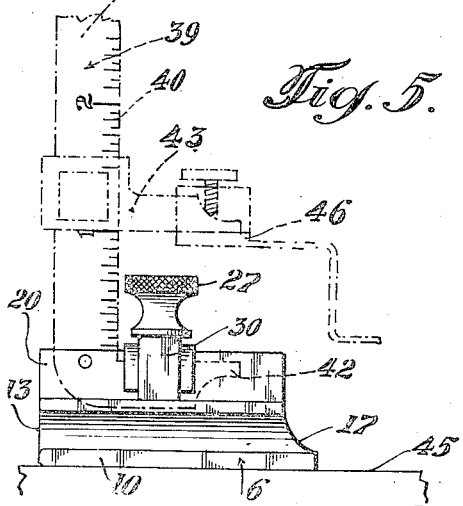
INVENTOR.
Eric A. Thorsberg
BY
Richards & Geier
ATTORNEYS Patented Jan. 23, 1945

2,367,743

UNITED STATES PATENT OFFICE 2,367,743

MEASURING IMPLEMENT

Eric A. Thorsberg, Mahopac, N. Y.

Application May 10, 1943, Serial No. 486,332

3 Claims. (Cl. 33—169)

This invention relates to a device for use in conjunction with measuring instruments.

Measuring instruments which are now in general use include calipers having an arm firmly attached to a scale carrying element, and another arm extending parallel to the first arm, and movable upon the element. The distance between the two arms may be read upon the scale and determines the width of an article to be measured.

Another measuring instrument often used in work shops and other establishments is a device determining the vertical distance of the article to be measured and consisting of a support, a vertical rod carried by the support, and an arm slidable upon the vertical rod. The arm is pressed against the top of the article to be measured and the height of the article may be determined upon a scale.

Instruments of the described types are comparatively expensive. Since the instrument of one type cannot be substituted for another type, a work shop or other establishment is compelled to maintain a variety of instruments which considerably increase the cost of equipment.

An object of the present invention is the provision of conversion means through the use of which an instrument of one of two described types may be conveniently and easily converted into an instrument of the other type, and vice versa.

Another object is the provision of an implement for converting the standard calipers into a height measuring instrument and vice versa.

Other objects of the present invention will become apparent in the course of the following specification.

In accomplishing the objects of the present invention, it was found desirable to provide a conversion instrument having the form of a comparatively heavy support adapted to be placed upon a flat surface and carrying clamping means for the immovable arm of a caliper. The clamping means preferably comprise a rail constituting a part of the support, and one or more pivotally mounted clamping elements actuated by a spring loaded nut and adapted to press the immovable arm of the calipers against said rail.

The invention will appear more clearly from the following detailed description when taken in connection with the accompanying drawing, showing, by way of example, a preferred embodiment of the inventive idea.

In the drawing:

Figure 1 is a top view of a conversion instrument constructed in accordance with the principles of the present invention.

Figure 2 shows the implement in side elevation.

Figure 3 is a section along the line 3—3 of Figure 2.

Figure 4 is a section along the line 4—4 of Figure 3.

Figure 5 shows the implement in side elevation and illustrates the manner in which it is used for converting calipers into a height measuring instrument.

The device shown in the drawing includes a comparatively heavy support 6 having bottom surfaces 7 and 8 which make it possible for the support to be placed firmly upon a bearing surface. The support 6 may have a wider lower portion 9, provided with vertical side surfaces 10. The front of the support has the form of a comparatively sharp nose formed by converging side surfaces 11 and 12, terminating in a round edge 13. The side surfaces 11 and 12 are curved inwardly. The middle portion of the support 6 has side surfaces 14 and 15 which are also provided with inwardly directed curvatures 16, constituting a continuation of similar curvatures provided in the side surfaces 11 and 12. The rear end 17, of the support 6, is also curved, as shown in Figure 2.

The support 6 has a flat, horizontal surface 18 which is separated by a groove 19 from a vertical surface 20, constituting a part of a rail 21. The rail 21 is integral with the support 6, and has a curved outer surface 22 which joins at an angle the inwardly curved portions 16 of the sides 15 and 12. The surface 20 of the rail 21 is used as one of the clamping members of the implement.

The other clamping element is carried upon a bolt 23 which includes a smooth portion 24, firmly imbedded in a bore hole 25 of the implement. A portion 26 of the bolt 23 is threaded and carries a knurled nut 27.

A coiled spring 28 embraces the bolt 23, and is situated between the surface 18 and a washer 29.

The bolt 23 carries a member 30 which is mounted with play thereon and which is carried by the washer 29. The member 30 has a rear downwardly projecting end 31, and a curved front end 32. This part of the member 30 carries a pin 33. The pin 33 projects on both sides of the member 30 and serves as a carrier for two clamping elements 34 and 35 which extend on opposite sides of the member 30.

Each of these clamping elements has a downwardly extending portion 36, having a smooth surface 37 which extends parallel to the surface 20 of the rail 21. Furthermore, each of these clamping elements has a hook portion 38 extending at right angles to the surface 37.

The manner in which the described device is used is illustrated in Figure 5. A caliper 39 is provided with a scale 40, located upon a bar 41. An immovable arm 42 is firmly connected with the bar 40. A sliding arm 43 is mounted upon the bar 41, and is movable thereon.

The caliper 39 is transformed into a device for measuring vertical distances by inserting the arm 42 of the caliper into the space 44, illustrated in Figure 3 and located between the surface 20 of the rail 21, and the surfaces 37 of the clamping elements 34 and 35. Then the user screws the nut 27 downwardly, thereby shifting downwardly the member 30 and the gripping elements 34 and 35 which are carried thereby, against the pressure of the spring 28. This will cause the gripping elements 34 and 35 to grip tightly the edge of the arm 42 of the caliper 39 until a very firm connection is attained. Then the bar 41, which extends upwardly, may be used for the purpose of measuring heights or vertical distances from the ground level 45 merely by shifting the movable arm 43 to the desired extent.

The arm 43 may be provided with an attachment 46, which is mounted thereon and which serves the purpose of providing a zero reading which will coincide with the level of the supporting surface 45.

It is apparent that the illustration shown above has been given by way of illustration and not by way of limitation, and that the construction above described is subject to wide variations and modifications without departing from the scope or intent of the present invention. All of such variations and modifications are to be included within the scope of the present invention.

What is claimed is:

1. A caliper-converting implement, comprising, in combination, a rail-carrying support, a rail carried by said support having a vertical clamping surface, a hook shaped clamping member facing said rail, a pivot carrying said clamping member, an element carrying said pivot, whereby said clamping member is swingable in relation to said element, a pin having an end mounted upon said support and having a middle portion extending with play through said element, and a spring surrounding the part of said pin between said middle portion and said end and supporting said element, whereby said element may be actuated to operate said clamping member.

2. A caliper-converting implement, comprising, in combination, a rail-carrying support, a rail carried by said support and having a vertical clamping surface, a pair of hook-shaped clamping members facing said rail, an element, said hook-shaped clamping members being situated on opposite sides of said element, a pivot carrying said clamping members and carried by said element, whereby said clamping members are swingable in relation to said element, a pin having an end mounted upon said support and extending with play through said element, a washer mounted upon said pin and supporting said element, a coil spring surrounding the part of said pin between said middle portion and said end and having one end engaging said support and another end engaging said washer, said pin having a threaded portion, and a nut screwed upon said threaded portion and engaging said element for actuating the same to operate said clamping members while compressing the coil spring.

3. A caliper-converting implement, comprising a rail-carrying support, a rail carried by said support and having a vertical clamping surface, a pair of hook-shaped clamping members having parallel vertical and horizontal clamping surfaces which face the vertical clamping surface of said rail, an element situated between said hook-shaped clamping members and pivotally supporting the same, whereby said hook-shaped clamping members are swingable in relation to said element, said element having an end portion supported by said rail-carrying support, and a curved top portion, a pin having an end mounted upon said support and having a middle portion extending with play through said element, resilient means surrounding the part of said pin between said middle portion and said end and supporting said element, said resilient means engaging said support, and a nut screwed upon said pin and engaging the curved top portion of said element for actuating the same while compressing said resilient means to operate said clamping members relatively to the vertical clamping surface of said rail.

ERIC A. THORSBERG.